United States Patent [19]
Walton

[11] Patent Number: 5,618,031
[45] Date of Patent: Apr. 8, 1997

[54] CABLE PULLEY DEVICE AND METHOD

[75] Inventor: Newton C. Walton, North Wilkesboro, N.C.

[73] Assignee: Data Connections, Inc., Greensboro, N.C.

[21] Appl. No.: 415,856

[22] Filed: Apr. 3, 1995

[51] Int. Cl.⁶ .................................................. B65H 59/00
[52] U.S. Cl. ................................................ 254/134.3 PA
[58] Field of Search ................................... 254/388–404, 254/410–414, 134.3 PA, 134.3 R; 24/16 PB, 17 AP, 30.5 P, 115 L, 129 A

[56] References Cited

U.S. PATENT DOCUMENTS

| | | | |
|---|---|---|---|
| 2,181,072 | 11/1939 | Sayers | 254/134.3 PA |
| 2,858,106 | 10/1958 | Anton et al. | 254/134.3 PA |
| 3,099,054 | 7/1963 | Spiro | 24/16 PB |
| 4,128,220 | 12/1978 | McNeel | 24/16 PB |
| 4,182,005 | 1/1980 | Harrington | 24/16 PB |
| 4,239,188 | 12/1980 | Hobbs | 254/376 |

FOREIGN PATENT DOCUMENTS 2220979  7/1988  United Kingdom ............ 24/DIG. 16

Primary Examiner—Robert C. Watson

[57] ABSTRACT

A lightweight cable pulley device and method provide ease and convenience in offices and other buildings during the installation of sensitive data transmission cable such as termed: "Category 5" or fiber optic. The pulley device is suspended by an integral strap and the cable supported therefrom by a single installer without the necessity of a helper to pass the cable around turns or obstacles in the path. A pulley wheel is rotatably attached to an axle which is affixed to the strap at one end, with the other end positionable through a pair of strapped catches proximate the wheel. The cable guide is attached to the inside of the strap above the wheel to allow the cable to securely pass between the wheel and the guide.

11 Claims, 2 Drawing Sheets

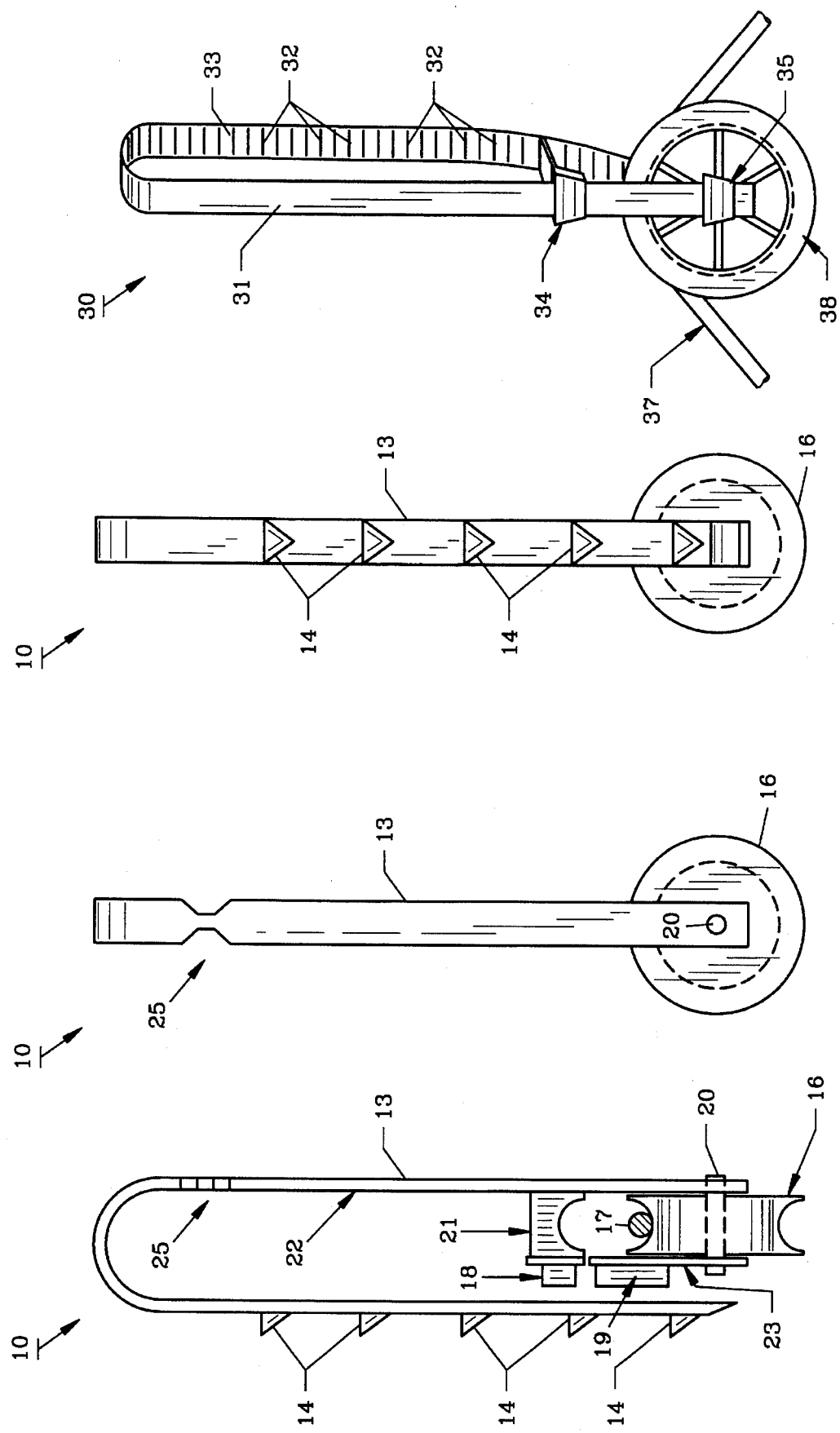

CABLE PULLEY DEVICE AND METHOD

BACKGROUND OF THE INVENTION

1. Field of the Invention

The invention herein pertains to installing cable in office buildings and other structures and particularly pertains to installing sensitive data communications cables such as identified as Category 5 or fiber optic, utilizing a lightweight pulley device by one installer.

2. Background and Objectives of the Invention

With the increased use of computers, computer terminals, facsimile machines, and other electronic data generating devices, office building occupants are requiring that their offices be adequately wired with data communications cables for internal data transmissions. In addition, new buildings are now frequently being wired with data transmission cables to allow communications from floor to floor and office to office within. Modern data communications cables are unlike conventional electric supply wires in that data transmission cables are manufactured with specific dimensions to ensure proper data flow with minimum interference. For example, Category or level "5" cable usually consists of four (4) pairs of intertwined copper wires which should not be bent to a diameter less than ten times the cable diameter. In addition, fiber optic cables are likewise sensitive to sharp bends, turns and other stresses which can affect their diameter and thus distort data transmission.

During wiring of buildings, whether with data cables such as Category 5 or with optical fiber cable installers usually work in pairs, which is generally a necessity to direct the sensitive cables along or around joists, rafters, and other structural components. The use of "teams" of installers is expensive with one team member often being idle for extended periods during the installation process. In addition, installers must be extremely careful in turning corners and in pulling cables from one level to another so that the cables are not unduly stressed or deformed. Consequently, with conventional techniques employed in installing fiber optic or other sensitive data communications cables, problems have arisen requiring the cables to be removed and reinstalled at a later date at great time and expense.

With the disadvantages and problems associated with conventional installation devices and techniques, the present invention was conceived and one of its objectives is to provide a data communications cable pulley device and method which will facilitate cable installation during building construction and retrofitting procedures.

It is another objective of the present invention to provide a lightweight cable pulley device which includes a pulley wheel and adjustable flexible strap attached thereto for suspending sensitive data communications cable.

It is yet another objective of the present invention to provide a cable pulley device which can be easily pivotally fastened to a variety of supports.

It is still another objective of the present invention to provide a method of installing data communications cable whereby the aforementioned pulley device is employed by a single installer.

It is also another objective of the present invention to provide a cable pulley device which is formed from lightweight, polymeric materials which are relatively inexpensive to manufacture and purchase.

Various other advantages and features of the invention will become apparent to those skilled in the art as a more detailed description is set forth below.

SUMMARY OF THE INVENTION

The invention herein provides a pulley device and method whereby sensitive data communications cable can be installed in office buildings and the like by a lone installer easily and without damage to the cable. A lightweight pulley device is provided having a pulley wheel attached to a closable strap. The strap includes a plurality of latches that are positioned along the flexible strap whereby the strap can be adjustably fastened to a stringer or other rigid support to hold the pulley in a desired position. A pulley guide is affixed to the strap for latching purposes. In one embodiment of the invention, the flexible strap includes a designated break area whereby excess force on the pulley device, such as by overstretching the communications cable will cause the strap to break and prevent damage to the communications cable during installation. In another embodiment of the invention, the flexible strap utilizes a conventional "tie-wrap" configuration.

BRIEF DESCRIPTION OF THE DRAWINGS

FIG. 2 demonstrates the pulley device as shown in FIG. 1 in an open posture;

FIG. 3 shows, right side view of the pulley device shown in FIG. 2;

FIG. 5 demonstrates another side view of the pulley device as shown unopened as in FIG.2;

FIG. 6 illustrates yet another embodiment of the pulley device; and

DESCRIPTION OF THE PREFERRED EMBODIMENTS AND OPERATION OF THE INVENTION

Figure 1:
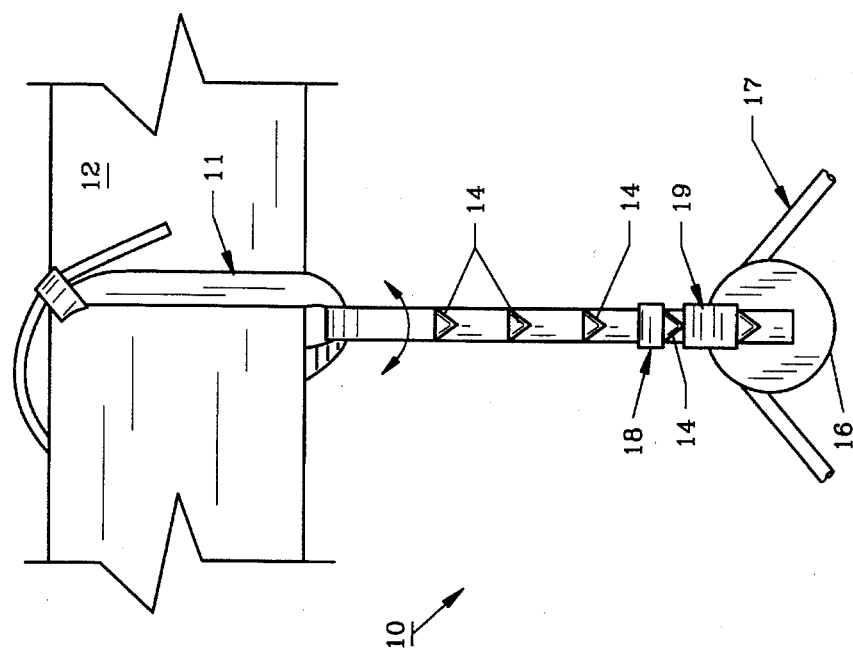
FIG. 1 demonstrates the preferred form of the pulley strap of the invention affixed to a building structural component.

For a better understanding of the invention and its use, turning now to the drawings, FIG. 1 illustrates the preferred form of cable pulley device 10 which is pivotally attached by conventional tie strap 11 to stringer 12 which may be, for example, a wooden 2×4" as conventionally used for construction purposes. As shown, pulley device 10 may be formed entirely of a polymeric material such as nylon, polypropylene, or other Suitable plastics. Pulley device 10 includes flexible strap 13 having a plurality of latches 14 therealong which are somewhat wedge-shaped and extend from the outer surface 15 of flexible strap 13. When used, pulley device 10 prevents a damaging acute angle being formed in cable 17 due to the relatively large diameter of pulley wheel 16 as compared to the diameter of cable 17. Typical data communications cable may be identified as Category 5 cable or optical fiber cable First strap catch 18 is shown in FIG. 1 above pulley wheel 16 and a second strap catch 19 is affixed proximate the top of pulley wheel 16. In FIG. 2, cable pulley device 10 is shown in an open form prior to attachment to a stringer or other building component. As further seen, pulley wheel 16 is attached to flexible strap 13 by axle 20 passing therethrough. As would be understood, pulley wheel 16 is rotatably positioned on axle 20 to allow cable 17 (FIG. 1) to move easily therealong. Cable guide 21 is mounted to inside surface 22 of flexible strap 13 with first strap catch 18 affixed thereto. Second strap catch 19 is joined to cable axle 20 through intermediate vertical strap catch support 23.

Figure 4:
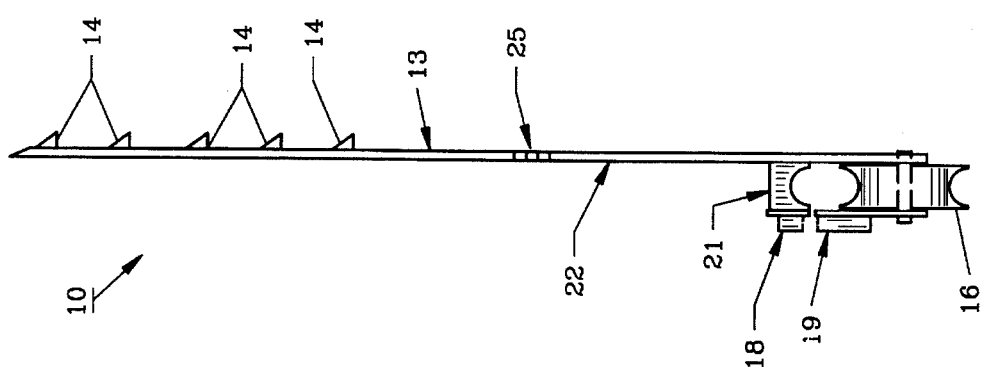
FIG. 4 demonstrates the pulley device of FIGS. 1–3 with the strap in a linear posture.

In the event cable 17 is pulled against pulley device 10 with a force of sufficient magnitude to damage cable 17, a safety feature is provided in the form a thin or weak area in strap 13. This inherent weak area is termed a "designated break area", as shown at 25 in FIGS. 2 and 3. Break area 25 is of lesser diameter and has been calculated, based on the tensile strength of strap 13 to break when a predetermined force is applied, and therefore release cable 17 before damage such as stretching of cable FIG. 4 illustrates pulley device 10 with flexible strap 13 fully opened prior to placement around stringer 12 or the like as shown in FIG. 1. Wedge-shaped latches 14 as would be understood are flexible allowing easy placement through first strap catch 18 and second strap catch 19 as shown.

In FIG. 5, a front view of pulley device 10 is shown in open form as illustrated in FIG. 2.

Pulley device 10 is preferably utilized by a lone installer, as no help is required to feed communications cables or lines around corners or turns. Instead, flexible strap 13 is attached as shown in FIG. 1 to provide universal pivoting action and with cable 17 positioned between cable guide 21 and wheel 16, cable 17 can then be pulled therealong through various turns and angles without fear of stretching, injuriously bending, or otherwise damaging cable 17.

Figure 7:
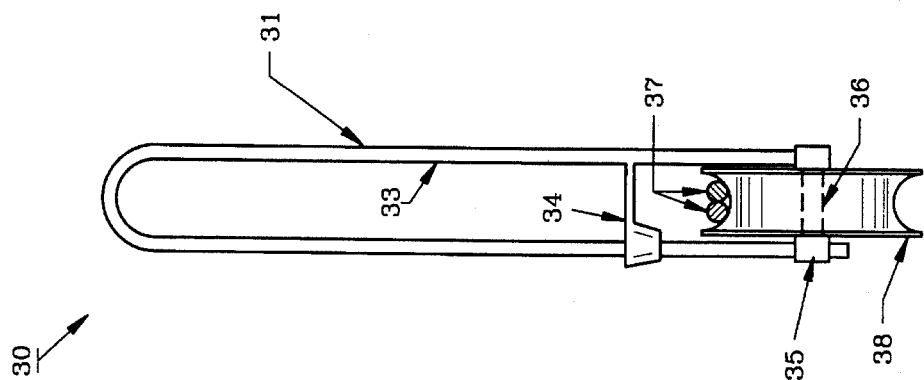
FIG. 7 demonstrates a front view of the pulley device as shown in FIG. 6 with a pair of cables therein.

In FIG. 6 another embodiment of the invention is illustrated whereby pulley device 30 is shown in a side elevational view. Flexible strap 31 is provided with teeth 32 along inside strap surface 33 as also shown in FIG. 7. Teeth 32 are of the conventional type as shown along tie strap 11 in FIG. 1 and do not protrude from strap 31 as do wedge-shaped latches 14 positioned on strap 13 as seen in FIGS. 1–5. As further shown in FIG. 7, first strap catch 34 is affixed to inside surface 33 of flexible strap 31 and as understood, first strap catch 34 maintains strap 31 in place as teeth 32 easily slide into and through first catch 34 and second catch 35, but strap 31 prohibits withdrawal. Second strap catch 35 is affixed to pulley wheel axle 36 and is so positioned to maintain Strap 31 against the side surface of pulley wheel 38. With strap 31 so placed, each cable 37 is prevented from exiting the confinement provided by first strap catch 34, pulley wheel 38 and along the sides by flexible strap 31. As hereinbefore mentioned, pulley device 30 can be formed entirely of a conventional lightweight polymeric material whereby an installer can easily carry a number of pulley devices 30 without undue effort or inconvenience.

While the embodiments of the invention described in FIGS. 1–7 are formed of a conventional polymeric material, it is envisioned that pulley device 10 may be formed of metal or other materials suitable for plenum or non-plenum uses, as necessary. Other sizes and diameters of pulley wheel 16 may also be provided, depending on the exact cable type and size and the specific embodiments and examples shown herein are not intended to limit the scope as defined by the appended claims as other embodiments and equivalents are anticipated.

I claim:

1. A pulley device for a data transmission cable, comprising: a flexible strap, said strap including a plurality of latches, a wheel, said strap attached to said wheel and a cable guide, said cable guide attached to said strap, a first strap catch, said first strap catch attached to said cable guide, said first strap catch for engaging said latches, a second strap catch, said second strap catch spaced from said first strap catch and attached to said wheel, said second strap catch for engaging said latches.

2. The cable pulley device of claim 1 wherein said cable guide is affixed to the inside surface of said strap.

3. The cable pulley device of claim 1 wherein said strap includes a designated break area therealong.

4. The cable pulley device of claim 1 wherein said strap is formed from a polymeric material.

5. The cable pulley device of claim 1 wherein said strap is formed of metal.

6. The cable pulley device of claim 1 and including a wheel axle, said axle passing through said wheel and affixed to said strap.

7. The cable pulley device of claim 6 wherein said axle is attached to the inside surface of said strap.

8. A pulley device for a data transmission cable, comprising: a flexible strap, a wheel, a wheel axle, said wheel axle positioned within said wheel; one end of said strap joined to said axle, a cable guide, said cable guide attached to the inside of said strap above said wheel, a first strap catch for receiving the other end of said strap, said first strap catch attached to said cable guide, a second strap catch, said second strap catch joined to said axle, said second strap catch spaced from said first strap catch.

9. A method of supporting a data communication cable from a pulley device having a wheel, a flexible strap with a cable guide attached to the inside surface of said strap, a first strap catch attached to the cable guide, a second strap catch attached to the wheel, the first strap catch separated from the second strap catch, said method comprising the steps of:

(a) suspending the pulley device from a support structure, (b) passing the cable through the pulley device to support the same, (c) passing the flexible strap through the first strap catch, and (d) passing the flexible strap through the second strap catch.

10. The method of claim 9 wherein supporting the pulley device comprises pivotally supporting the pulley device.

11. The method of claim 9 wherein passing the cable through the pulley device comprises passing the cable between the wheel and the cable guide.

\* \* \* \* \*